June 6, 1961 R. E. MAURER 2,987,397
METHOD OF PRESCREENING OF FILM
Filed March 10, 1958 6 Sheets-Sheet 1

Richard E. Maurer
INVENTOR.

BY R. Frank Smith
F. M. Emerson Holmes
ATTORNEYS

June 6, 1961  R. E. MAURER  2,987,397
METHOD OF PRESCREENING OF FILM
Filed March 10, 1958  6 Sheets-Sheet 2

Richard E. Maurer
INVENTOR.

BY R. Frank Smith
F. W. Emerson Holmes
ATTORNEYS

June 6, 1961 R. E. MAURER 2,987,397
METHOD OF PRESCREENING OF FILM
Filed March 10, 1958 6 Sheets-Sheet 3

*Fig. 14A*

DEVELOP

*Fig. 14B* — REHALOGENIZE BLEACH

*Fig. 14C* — UNIFORMLY EXPOSE

*Fig. 14D* — DEVELOP

*Fig. 14E* — PEROXIDE ETCH

*Fig. 14F* — UNIFORMLY EXPOSE

*Fig. 14G* — DEVELOP

*Fig. 14H* — REREGISTER

*Fig. 14I*

Richard E. Maurer
INVENTOR.
BY
ATTORNEYS

June 6, 1961 R. E. MAURER 2,987,397
METHOD OF PRESCREENING OF FILM
Filed March 10, 1958 6 Sheets-Sheet 4

Richard E. Maurer
INVENTOR.
BY
ATTORNEYS June 6, 1961 R. E. MAURER 2,987,397
METHOD OF PRESCREENING OF FILM
Filed March 10, 1958 6 Sheets-Sheet 5

Richard E. Maurer
INVENTOR.

June 6, 1961 R. E. MAURER 2,987,397
METHOD OF PRESCREENING OF FILM
Filed March 10, 1958 6 Sheets-Sheet 6

Richard E. Maurer
INVENTOR.
ATTORNEYS 2,987,397
METHOD OF PRESCREENING OF FILM
Richard E. Maurer, Rochester, N.Y., assignor to Eastman Kodak Company, Rochester, N.Y., a corporation of New Jersey
Filed Mar. 10, 1958, Ser. No. 720,255
7 Claims. (Cl. 96—45)

This invention relates to prescreening photographic film and is a modification of the Clayden desensitized prescreened film described in U.S. Patent 2,691,586, Yule et al.

The primary object of the invention is to obtain improved dot quality in Clayden prescreened film.

One prior method of improving the shadow dot quality in Clayden prescreened film involved hypersensitization of the center of the dots. Since it is a matter of choice in half-tone work as to which is called the center and which is called the corner of a dot, the present specification uses the term center to refer to that area which becomes black even at low exposures. This is the shadow dot in a negative. The present invention eliminates the need for hypersensitizing (although as discussed later it can be combined with hypersensitizing for special effects). Hypersensitizing affects different emulsions differently and in some cases it tends to fade or to grow with age, although the particular emulsion may otherwise be very desirable for prescreening work.

The hypersensitization was also used in prior systems to extend the scale beyond that obtainable by the Clayden effect alone. However it is possible to extend the scale or, more exactly, to utilize the full Clayden effect available, either by means of the present invention or by proper selection of screen opening and exposure aperture when prescreening by Clayden exposure. In many cases the present invention is much more convenient to use than systems involving special apertures and the like. Thus the present invention permits a high degree of Clayden effect to be utilized in prescreening, without the need of hypersensitizing. Furthermore this long scale is obtained with much better tonal values and also much better dot quality in the shadows (or highlights if the prescreened material is used for making positives).

Special forms of the present invention permit improvement in both the shadows and the highlights and some of the special systems are useful in the making of contact half-tone screens as well as in prescreening.

Since the term "dot" is used in the halftone art to mean (a) the total elemental area which includes one dot, i.e. one square having four corners (b) the small black dot covering part of the total dot or (c) the small white dot which remains at the corners when the black dot expands to fill practically all of the total dot area, terminology must be carefully defined, even though the terms are used in their commonly accepted sense. When one refers to the center of the dot or the corner of the dot, the term "dot" means the whole elemental area and not just the black or white part thereof. When one speaks of the dot being sharp, one is, of course, referring to the edge between the black or dense area and the clear or white area; thus, in this connection, the term "dot" means the black or white spot and does not mean the total dot area or total element. When one refers to the total dot area, one is not referring to the area of the black spot or even to the area of all the black spots put together; one is referring to the area of the total element or elemental area. In general, the opaque "dot" covers only part of a total "dot," just as a small area can cover part of a large area. It is common in referring to halftone tints to define the tint in terms of the percentage of the total dot area covered by the dot center or by the opaque dot. For example a 10% tint is one in which the dot center or opaque sharp dot covers 10% of the total dot area, the remainder of the area being made up of clear or white areas. A special case is the contact halftone screen in which the "dot" always refers to the total area of the element since the density varies continuously from the centers to the corners, except in special cases as discussed below.

The basic form of the present invention provides a method of prescreening in which the sensitivity in the dot centers is held at the normal unexposed value and is held uniformly at this value over an area covering from 1 to 10% of the total dot area. Thus the sensitivity is flat and high in the dot centers. The drop-off in sensitivity at the edges of this flat area is not absolutely sharp (i.e. not absolutely vertical on a graph) but it is steeper than the change in sensitivity elsewhere in the dot. The sensitivity drops very quickly to a value between 50% and 90% of the maximum value. The remainder of the area of each dot is desensitized by Clayden desensitization and the whole of the Clayden effect is available to provide a total range or scale down to some minimum value produced by maximum desensitization.

As an example of how the present invention conveniently permits extension of the scale beyond that obtained otherwise and permits full utilization of all of the Clayden effects available, an emulsion is considered here which is such that when fully Clayden desensitized it loses 1.3 log E units in sensitivity, but without the present invention, the particular screen and exposing system employed causes the emulsion also to lose .3 unit in sensitivity at the centers of the dots. In the present example of the invention, however, the sensitivity remains at a maximum at the dot centers and over an area covering about 6% of the total dot area and then drops rather sharply about .3 equivalent log E units and continues to decrease on a smooth curve to a value of 1.3 (in equivalent log E units) less than the maximum in this particular example. In this case the sensitivity at the dot corners is about 5% of the maximum and rises rather slowly to about 50% of the maximum near the edges of the dot centers.

The characteristic curve of a photographic emulsion is obtained by plotting density against log of exposure (log E). Since .3 is the log of 2, a loss of .3 equivalent units in sensitivity means that two times as much exposure is needed to give the same density.

The method of producing such a prescreened material, according to the invention, can take several forms, certain of which have advantages over the others. Clayden sensitive photographic film is prescreened according to the invention by exposing the film to a high intensity, short duration, uniform exposure of sufficient intensity and sufficiently short duration to give substantially maximum Clayden desensitization. This exposure is given through a compound screen which distributes the exposure at the film in a uniform dot pattern of varying intensity which is substantially zero at the dot centers and extending over center areas covering about 6% (i.e. between 1 and 10%) of the total dot area. This compound screen includes a ruled screen at halftone distance from the film and a mask (an 8% tint say) in contact with the film and registered with the ruled screen. Due to scattering within the emulsion itself during the exposure, there is some intensity under the mask dots; thus the mask dot is purposely made slightly larger than the center area which is to have zero intensity. For example a mask covering 8% of the total dot area might produce substantially zero intensity over 6% of the dot area.

Allowing for the scattering, the intensity of the exposure still rises sharply at the edges of the center areas to a value which Clayden desensitizes the film .05 to .3 in equivalent Log E units. That is, the sensitization falls rapidly to between 90% and 50%. The intensity of the exposure continues to rise on a smooth curve from these edges, or more exactly from the value it has at these edges, to the maximum intensity passing through the screen, which maximum intensity approximates very closely the intensity mentioned above as being sufficient to give substantially maximum Clayden desensitization at the dot corners. No precision is involved in this end of the range; any density above a certain value and up to many times this value gives approximately maximum desensitization. The resulting prescreened material has dot center areas of uniform sensitivity covering 1 to 10% of the total dot area with sensitivity dropping sharply or rapidly at the edges of the center areas to a value between 50% and 90% of the maximum sensitivity and continuing to decrease on a smooth curve from said value to a minimum sensitivity at the dot corners between 3 and 25% of the maximum sensitivity. The dot areas other than the center areas are thus Clayden desensitized through a mask in contact with and substantially covering the center areas.

The present invention thus introduces the use of the "screen mask" in the making of prescreened materials.

The screen masks used herein are "tints" made from and used in register with a ruled crossline screen or the equivalent. Tints are usually sharp dot patterns but in some embodiments they are not absolutely sharp and such lack of sharpness contributes to the gradation in sensitivity at the edges of the center areas. In some special embodiments of the invention the tints have gray or colored dots rather than black.

The invention and various embodiments thereof will be more fully understood when read in connection with the accompanying drawings in which:

FIG. 1 schematically illustrates the prescreening of film according to a preferred embodiment of the invention.

FIGS. 2, 3 and 4 illustrate schematically the theoretical effect of this prescreening and FIGS. 5, 6 and 7 similarly illustrate the way in which the invention actually operates.

FIGS. 14A to 14I constitute a flow chart of one process for the production of a screen mask such as used in FIG. 1.

FIGS. 15A to 15D constitute the first steps of a preferred process for producing such a screen mask.

FIGS. 16A to 16C and FIGS. 17A and 17B similarly show the first steps of other processes which have certain advantages, but which are less satisfactory than the processes shown in FIGS. 14A—14I and 15A—15B.

Figures 1, 2, 5:
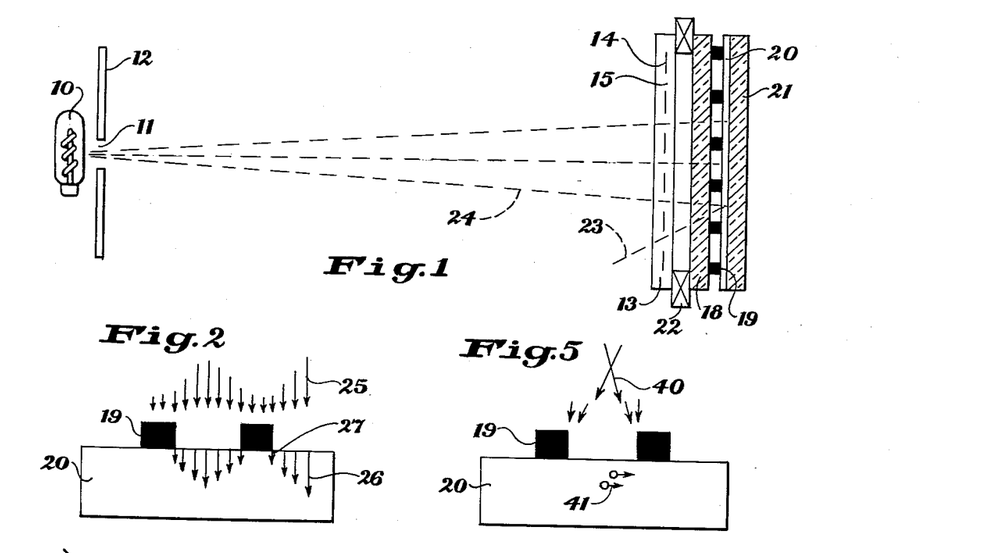

FIG. 1 illustrates the prescreening of Clayden desensitizable photographic film according to a highly preferred and simple form of the present invention. A flash lamp 10 capable of giving a very high intensity, short duration exposure, illuminates an aperture 11 in a lamp house or mask 12. The aperture 11 may be round or square or have any of the other various shapes commonly used in half-tone work for controlling the distribution of light behind each opening of a crossline screen. A plurality of apertures in the mask 12 together with a suitable reflector behind the lamp 10 may be used in the usual way to reinforce the exposure through each screen opening by light through the adjacent opening. All of this is the same as in prior systems such as shown in FIGS. 15 to 17 of U.S. Patent 2,691,586, Yule et al., mentioned above. A ruled screen 1 is illustrated conventionally, the intersections 14 of the crosslines having a width equal to the width of the openings 15 in this particular screen. This is not a critical feature of the present invention. The ratio of the screen opening to the width of the lines may be selected for different effects. For example smaller openings 15 and smaller apertures 11 give a different degree of dot resolution behind the screen, but since this dot resolution is controlled primarily by diffraction effects, small apertures 15 and a small aperture 11 does not give a definite umbra behind each intersection 14.

A "tint" is a half-tone pattern of dots all exactly the same size. A 10% tint is one in which the dots cover 10% of the area; a 90% tint is one in which the opaque area covers 90% of the total area leaving small clear dots. Since there is no such thing as an absolutely sharp dot, there is always some gradation at the edges of the dots in a tint. This gradation merely adds to the effect of light scattering in the emulsion being exposed in most cases, but in certain special embodiments of the present invention an appreciable amount of gradation in the tiny dot of the tint is purposely used.

In FIG. 1, a tint made up of small black dots 19 carried on a transparent support 18 is registered with crossline screen 13 so that the dots 19 are directly behind the intersections 14 of the screen as far as the light source 10 is concerned. As discussed later, the tint is usually made from the crossline screen with which it is to be used so as to assure the proper registration. A film emulsion layer 20 carried on a support 21 is placed in contact with the tops of the dots 19. The emulsion 20 is the "half tone distance" from the crossline screen 13, the distance being determined by spacers 22 separating the screen 13 from the tint support 18.

"Half tone distance" is well understood in the half tone art and it depends on the fineness of the screen. For example, using a crossline screen of 65 lines per inch, the distance between the screen 13 and the emulsion layer 20 may be about 0.6 inch and the distance from the layer 20 to the aperture 11 can conveniently be about 80 inches. These values are not critical and may be varied as is customary for ordinary half-tone work.

For clarity, the dimensions in FIG. 1 are exaggerated. Only a single aperture 11 is shown as the effective light source. Corresponding apertures, not shown, to reinforce the exposure would send rays such as 23 through an adjacent aperture to reinforce the direct ray 24.

The dots 19 and the emulsion layer 20 are shown greatly enlarged in FIG. 2. The light rays 25 coming from the screen 13 are illustrated by arrows whose length correspond to the intensity as determined by the screen 13. The effect of these rays in the emulsion 20 is illustrated by arrows 26 whose lengths are longest at the corners of the dots but fall off to zero at the point 27 right at the edge of the mask dot 19. The intensity of distribution of the rays 25 is represented by the curve 30 in FIG. 3 and due to the dots 19 this intensity drops to zero as indicated at 31 at the edge of the dots 19.

Figure 3:
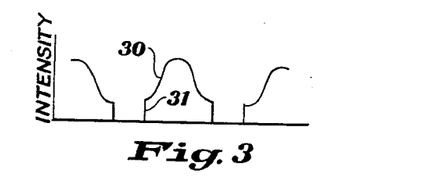
Figure 4:
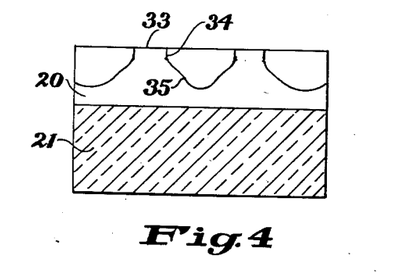

In FIG. 4 the distribution of sensitivity in the emulsion layer 20 is represented by a curve showing the maximum unchanged sensitivity in the area 33, a sharp drop 34 at the sides of the mask and a smooth curve 35 representing the distributing of Clayden desensitization. These FIGS. 2, 3 and 4 are included to give a clear idea of what takes place when a screen mask is used according to the present invention.

However the actual operation is not quite as shown (idealized) in FIGS. 2, 3 and 4.

Figure 6:
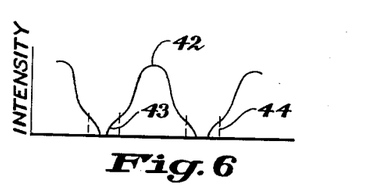
Figure 7:
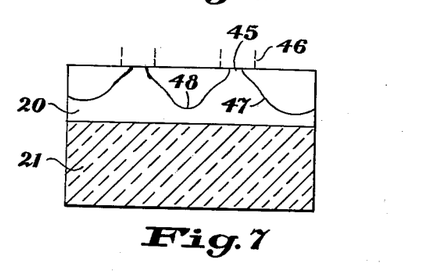

As shown in FIG. 5 the light rays 40 are not absolutely vertical to the film when they arrive. Furthermore as shown by small arrows 41 there is some scattering of the exposure after it enters the emulsion 20. The net result is that there is some exposure under the edges of the dots 19. The distribution of intensity as shown by curve 42 in FIG. 6 includes areas 43 having appreciable intensity even though they are under the mask dots, the edges of which are represented by dotted lines 44. The effect carries over into the Clayden desensitization represented by curve 47 in FIG. 7 which rises rather smoothly to a maximum sensitivity in a small area 45, smaller in area than the masked dots 19 whose edges are represented by the dotted lines 46. Maximum Clayden desensitization is achieved since there is no desensitization in the area 45 even though there has been sufficient intensity to complete the Clayden effect at the point 48. In practice it is more convenient to obtain this extended scale by the present invention than by other methods.

Figure 8:
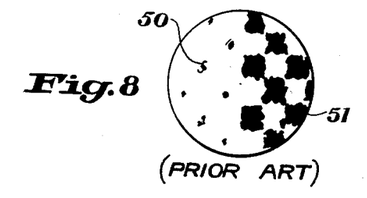
FIG. 8 is an enlarged view of shadow and middletone dots produced by a film of extremely high Clayden sensitivity, without the benefit of the present invention.

However the main purpose of the present invention is to improve dot quality. When one selects an emulsion having a particularly high degree of Clayden sensitivity, it turns out that the dot quality in the finished negative or picture made with the prescreened film, is sometimes inferior. As shown in FIG. 8 the shadow dots 50 are not perfectly round and even the middle tones have ragged dots 51. This is partially overcome in the prior systems by using a hypersensitizing exposure to give a hard core to the dot. The present invention gives an even better core and does not have any of the disadvantages of hypersensitizing such as fading or growth of the effect with age.

Figure 9:
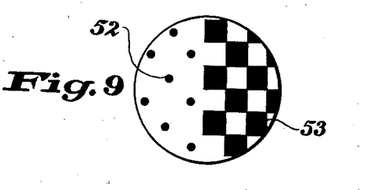
FIG. 9 illustrates the same shadow and middletone dots of the film made according to the present invention.

As illustrated in FIG. 9, however, the present invention results in sharp shadow dots 52 and uniform sharp middle tone dots 53.

Figure 10:
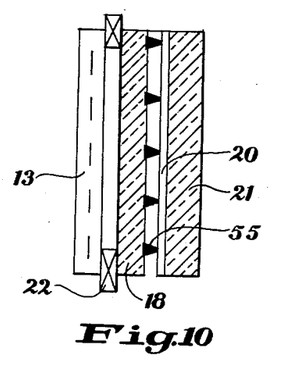
FIGS. 10, 11, 12 and 13 correspond to FIG. 1 and illustrate alternative embodiments of the invention.

FIG. 10 is similar to FIG. 1 except that the tint 18 has graded dots 55 instead of the sharp dots 19 in FIG. 1. The net effect of the graded dots 55 is to make the gradation 43 of FIG. 6 even more gentle.

Figure 11:
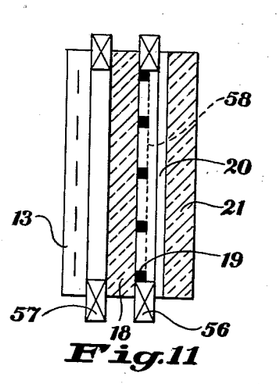

FIG. 11 is also similar to FIG. 1 except that the emulsion layer 20 is held away from the sharp dots 19 by spacers 56 and the spacers 57 between the screen 13 and the support 18 are somewhat smaller than the spacers 22 of FIG. 1 in order to insure that the emulsion 20 is still the half-tone distance from the screen 13. One advantage in having the dots 19 raised on the support 18 in FIG. 1 is that the dots act to hold the emulsion layer 20 away from the support 18. This prevents Newtons rings (optical interference effects) and reduces any tendency toward abrasion. Also better quality is obtained than if the dots 19 were not raised, particularly if dust is present. Small bits of dust in the absence of raised dots would interfere with a large area of the screen whereas in FIG. 1, they affect only one dot.

FIG. 11 also reduces the effect of dust particles even if the dots are not raised but are embedded in a layer represented by the dotted lines 58.

Figure 12:
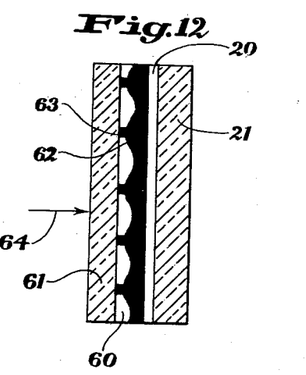

In FIG. 12 a single contact screen 60 on a support 61 is used in place of the compound screen (the ruled screen plus the screen mask) of FIG. 1. The contact screen 60 is made up of an undulating pattern of dots 62 each having an opaque core 63. The showing in FIG. 12 is schematic. The actual density at each point is distributed uniformly through the layer 60, but is illustrated in a conventional manner. With such a contact screen, the illumination represented by the arrow 64 may be general rather than through an aperture (such as 11 in FIG. 1).

Figure 13:
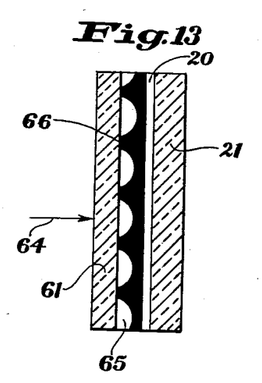

The arrangement shown in FIG. 13 is similar to that shown in FIG. 12 except that the contact screen has opaque areas 66 but the sides thereof are more sloping. Again the illustration is conventional; the density at each point is uniformly distributed through the layer 65. FIGS. 12 and 13 are included in this point to illustrate the form of contact screen equivalent to the compound screens of FIGS. 1, 10 and 11. The method of manufacturing the contact screen will be discussed in connection with FIGS. 18A to 20.

Methods of making a screen mask with raised dots such as used in the process illustrated in FIG. 1 will now be described.

Figures 14A, 14B:
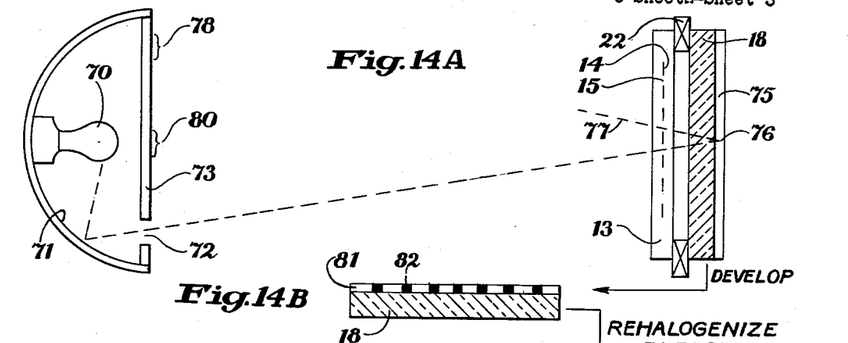

In FIG. 14A light from a tungsten lamp 70 reflected by a suitable reflector 71 through an aperture 72 in the mask 73 illuminates areas such as 76 in a lith-type emulsion 75, which areas 76 are located behind the intersections 14 of a ruled screen 13. That is, the area 76 is behind the apertures 15 as far as the light source and aperture 72 is concerned, but is behind an intersection 14 when used as in FIG. 1. The area 80 of the lamp house 73 represents the location of the aperture, for which the areas 76 are behind the opaque intersections 14 of the screen. The ray 77 represents a reinforcing ray from an aperture located in area 78 of the lamp house 73. In practice only one aperture 72 is used, but this is offset from the location 80 of the prescreening aperture 11 (FIG. 1). In FIG. 14A numbers corresponding to those used in FIG. 1 are used to avoid confusion. The masking dots 19 of FIG. 1 is to be formed in the emulsion layer 75 of FIG. 14A.

Any lith type emulsion is satisfactory for the layer 75; no Clayden effect is involved in the making of the screen mask itself. Of course any antihalation backing must be removed from the back of the support 18 before the exposure illustrated in FIG. 14A is applied. Ordinary development (DK 20 for 15 minutes) produces black dots 82 in an emulsion layer 81 as shown in Fig. 14B. This development includes stop bath treatment and a wash. For example, using a 60-watt tungsten lamp and a ¼ inch aperture 72 at a distance of 80-inches from the emulsion layer 75, exposure of 90 seconds produces a dot size of about 2% or slightly larger.

The developed, but not fixed, emulsion 81 is then bleached in a rehalogenizing solution for about 2 minutes. The rehalogenizing solution may conveniently be solution A of the Kodak Toner T-10. This solution A consists of:

| | Gram |
|---|---|
| Potassium ferricyanide | 30.0 |
| Potassium bromide | 15.0 |
| Water to make 1.0 liter. | |

Figure 14C:
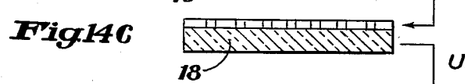
Figures 14D, 14E:
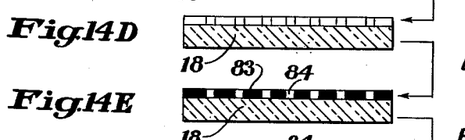

The bleached film is shown in FIG. 14C. It is then washed and dried and uniformly exposed, but not completely fogged. A 60-watt tungsten bulb at 5 feet with an exposure of 15 seconds produces a useful final dot size. There is some control of dot size by this exposure. Longer exposure gives smaller dots. The fogged film as shown in FIG. 14D is then developed in a standard lith developer for the usual time, i.e. 2 minutes at 68° F. to produce small clear dots 84 in a dark background 83 as shown in FIG. 14E. This development includes a stop bath treatment and wash.

Figure 14F:
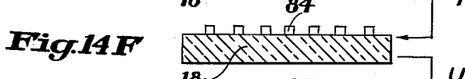

The plate is then subjected to a peroxide etch. This well known process removes the silver and any adjacent gelatin in which the silver is located leaving the silver halide and the gelatin accompanying the silver halide as dots 84 shown in FIG. 14F. One suitable formula for the etch bath treatment is as follows:

| | | |
|---|---|---|
| Water (125–150 F.) (50–65 C.) | cc | 750 |
| Copper sulfate | grams | 120.0 |
| Kodak citric acid | do | 150.0 |
| Potassium bromide | do | 7.5 |
| Water to make 1.0 liter. | | |

Solution B

| | Percent |
|---|---|
| Hydrogen peroxide, solution | 3 |

Figure 14G:
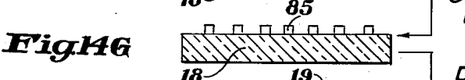
Figures 14H, 14I:
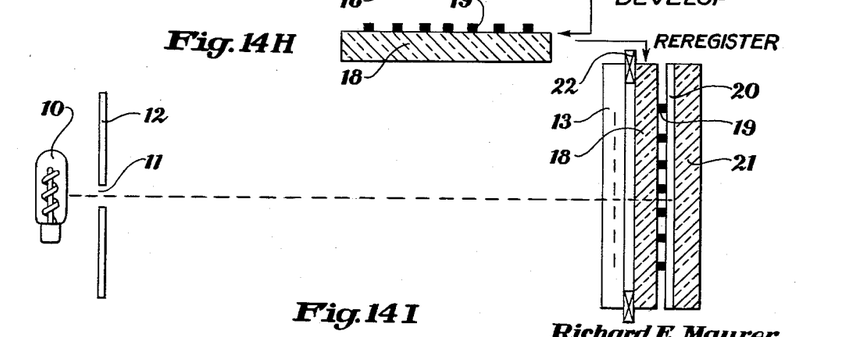

For use, mix equal parts of solutions A and B. The plate is then washed and uniformly exposed by turning on the room lights. The exposed film is shown in FIG. 14G. The dots 85, thus exposed, are then developed until they form substantially opaque dots 19 as shown in FIG. 14H. The plate is then reregistered with the screen 13 and a Clayden desensitizable layer 20 on a support 21 is brought into contact with the dots 19 and exposed by flash lamp 10 as shown in FIG. 14I which is fully equivalent to FIG. 1.

The reregistration step employs any of the usual process camera arrangements which permit accurate registration. Either visual registration or automatic registration by abutments or guides is satisfactory for this purpose.

There are several ways in which the plate in the stage shown in FIG. 14E can be prepared. The above discussed method is one of the best, but it is not the best because of the difficulty in getting a uniform distribution of dots in the rehalogenization step. Three alternative ways are shown in FIGS. 15A–15D, 16A–16C and 17A and 17B. After the plate has been prepared by any of these alternative methods, the remaining steps are the same as in FIGS. 14F to 14I and hence they are not illustrated following FIGS. 15D, 16C or 17B.

Figures 15A, 15B:
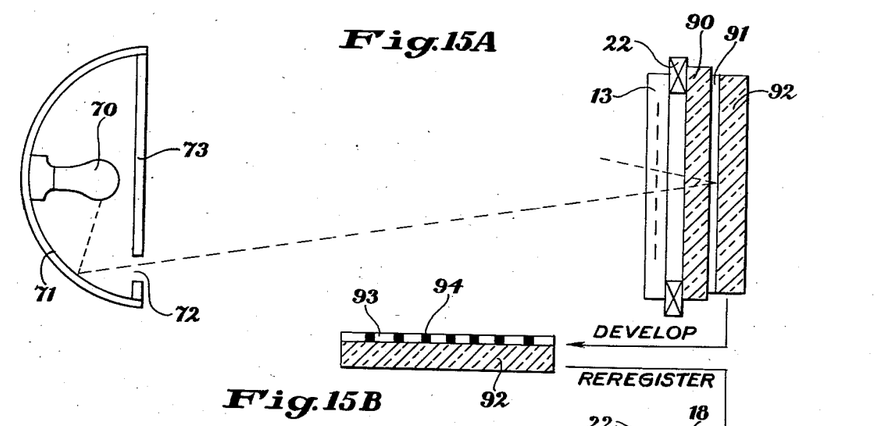

IN FIG. 15A a glass plate 90 acts as an additional spacer to insure that a lith type emulsion 91 carried on a support 92 is at halftone distance from the ruled screen 13. This special spacer 90 has the same thickness as a plate and emulsion which is ultimately to become the screen mask. An ordinary lith emulsion 91 is exposed and developed in a lith developer to produce a master plate with black dots 94 in clear areas 93 as shown in FIG. 15B. In FIG. 15A this emulsion 91 is exposed from the front, not through the base as was the emulsion in FIG. 14A.

Figures 15C, 15D:
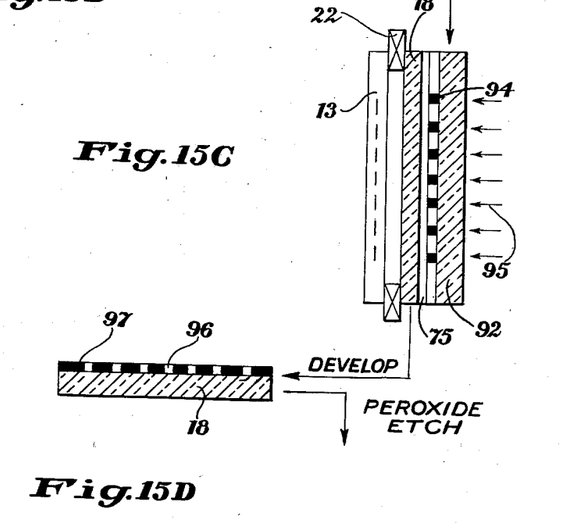

After developing, fixing and drying the master plate is reregistered as shown in FIG. 15C with the screen 13, but the spacer plate 90 has now been replaced by a sensitive lith emulsion 75 on a support 18. There is no exposure through the screen 13 in the step illustrated in FIG. 15C. In fact, except that automatic reregistration is later possible when the printing step is performed as shown in FIG. 15C, the screen 13 need not be present at this stage. A uniform exposure represented by the arrows 95 is then given through the master plate 92 and all of the areas of the emulsion 75, except those behind the dots 94 are fully exposed. The area behind the dots 94 is ultimately to become the screen mask dots 19 of FIG. 1.

When developed, as shown in FIG. 15D these areas behind the dots 94 become clear areas 96 on a dark background 97. The plate now corresponds to that shown in FIG. 14E and the steps from here on are identical to those shown in FIG. 14F to 14I. In spite of the care required in this double reregistration process, the arrangement shown in FIGS. 15A to 15D has proven to be the most satisfactory.

Figure 16A:
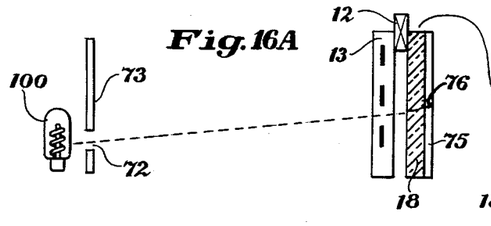
Figures 16B, 16C:
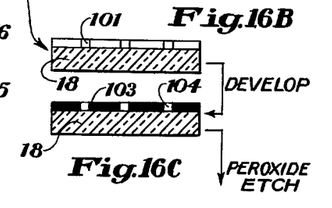

A somewhat similar arrangement is shown in FIGS. 16A to 16C, but since it is difficult to get adequate exposure, this process is less preferred. In the arrangement, a high intensity, short exposure, flash lamp 100 through aperture 72 illuminates the areas 76 in the emulsion 75 behind the opaque parts of screen 13, Clayden desensitizing the areas 76 and forming a less sensitive area 101, which is not fogged when the plate is uniformly exposed as shown in FIG. 16B. Direct development leads to opaque areas 103 with clear dots 104 as shown in FIG. 16C which thus correspond to FIG. 14E as required. As mentioned above it is difficult to get adequate desensitization.

Figure 17A:
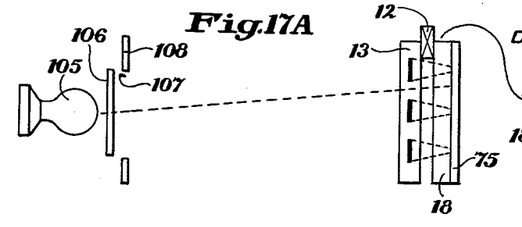
Figure 17B:
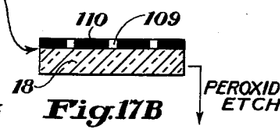

In FIG. 17A a tungsten lamp 105 through a diffusion screen 106 illuminates a large aperture 107 in the lamp house 108. Because of the large size of the aperture 107, considerably more of the dot area in emulsion 75 is exposed. However the difficulties encountered in the making of any 90% tint are present in this process and hence the dot quality is not uniform across the plate. Direct development forms fairly clear dots 109 in opaque areas 110 as shown in FIG. 17B and corresponding to the plate shown in FIG. 14E as required. The processes illustrated in FIG. 16A and 17A are shown because of their simplicity, but the arrangement shown in 15A is preferable because of the improved dot uniformity in the mask made thereby.

Figures 18A, 18B, 19, 20:
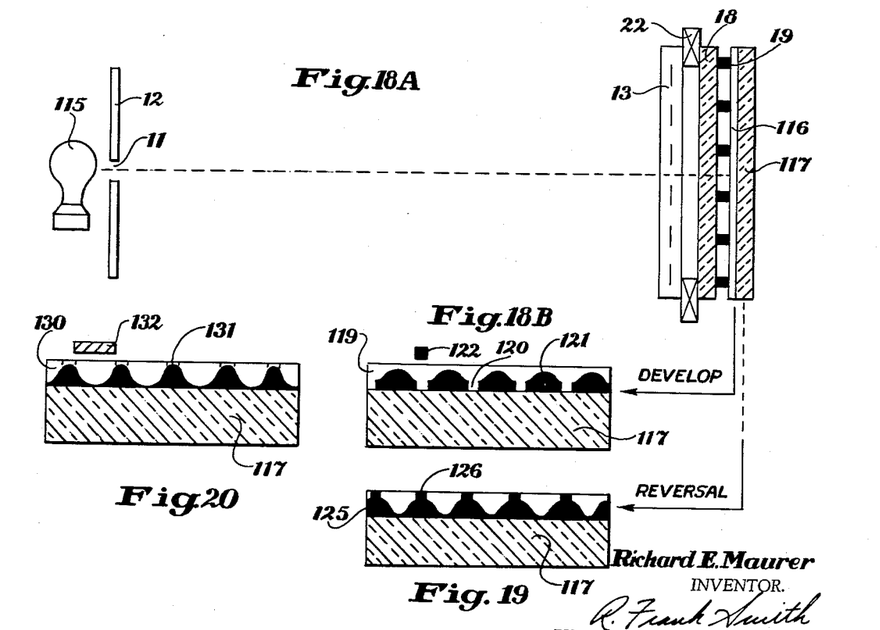
FIGS. 18A and 18B illustrate the production of a contact half-tone screen according to the invention.
FIG. 19 shows an alternative form of contact screen produced by a variation of the process shown in FIGS. 18A and 18B.
FIG. 20 similarly illustrates a contact screen made by another modification of the process shown in FIGS. 18A and 18B.

The making of contact screens is illustrated in FIGS. 18A and 18B. This is very similar to the prescreening illustrated in FIG. 1 except that a tungsten lamp 115 is used instead of a flash lamp in front of the aperture 11 in the lamp house 12. At half tone distance behind the screen 13 is a normal contrast emulsion 116. It is not a lith type emulsion and it need not be Clayden sensitive. It is carried by a support 117.

Ordinary development of the emulsion 116, as shown in FIG. 18B produces a contact screen 119 having sharp clear centers 120 and graded density up to the corners of the dots 121. The centers 120 are behind the areas which were masked by the dots 19 whose location is indicated in FIG. 18B by the black square 122. Following the convention adopted in this specification, the clear areas of the contact screen 120 are referred to as the centers since a half tone picture made through the screen will have its black dots behind these areas 120.

As illustrated in FIG. 19 simple reversal processing of the emulsion 116 leads to a very useful form of half-tone screen 125 in which the corners 126 are exceptionally opaque. This is not the best method of making this type of screen however. The arrangement shown in FIG. 20 gives better results in practice. In this latter arrangement, the masking screen or tint, instead of having black dots 19 covering about 10% of the area and located behind the opaque parts of screen 13, one employs a tint having gray dots (or colored dots which are effectively gray) covering about 80% of the dot area. The exposure is otherwise the same as in FIG. 18A. As before the corners of the dots in the emulsion 116 are fully exposed, but all of the area except for the corners receives somewhat less exposure. The result is shown in FIG. 20 wherein the contact half tone screen 130 has the corners 131 fully exposed and directly developed. The 80% (gray) tint masks the centers of the dots, the effective location of the masking dots being indicated at 132. In practice this screen shown in FIG. 20 is very similar to that shown in FIG. 19 and is useful in certain types of half tone work. Thus the present invention using a screen mask in combination with the screen is applicable to the making of contact screens as well as to the prescreening of film by Clayden desensitizing.

Figures 21, 22:
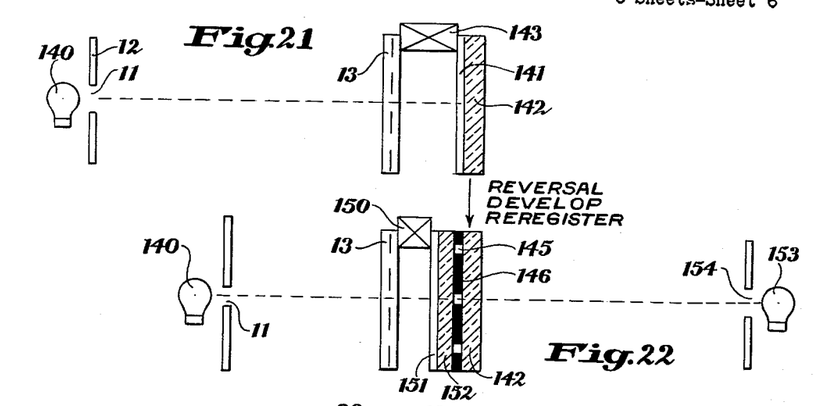
FIGS. 21 and 22 illustrate a special process useful either in the manufacturing of contact screens or in the prescreening of sensitive film.

FIGS. 21 and 22 have to do with a process of double screening either when making contact screens or when prescreening. There is no screen mask in this particular process, at least in the sense in which a screen mask is used in the processes described above. In FIG. 21 light from a tungsten lamp 140 through a small aperture 11 in a mask or lamp house 12 illuminates a lith-type emulsion 141 carried on a base 142, through a crossline screen 13. The emulsion 141 is located by spacers 143 which are relatively large and correspond to the relatively long distance between the aperture 11 and the emulsion 141. The emulsion 141 is then reversal developed to form clear dots 145 in opaque areas 146. It is then reregistered with the screen 13, but the spacers 143 are replaced by smaller spacers 150 and an emulsion layer 151 carried on a support 152. When making contact screens, the emulsion 151 is a normal contrast emulsion. When prescreening lith film, the emulsion 151 is a Clayden sensitive lith type emulsion.

The purpose of the arrangement shown in FIG. 22 is to expose the emulsion layer 151 partly through the screen 13 by means of lamp 140 and aperture 11 (which have been moved closer to the screen 13 than in FIG. 21) and partly through the clear dot image 145 by means of a lamp 153 and aperture 154. Because of the thicknesses of the support 152 the exposed areas of emulsion 151 through the clear dots 145 are slightly farther apart than these dots 145. It is for this reason that the lamp 140 has to be moved closer to the screen 14 in FIG. 22 than in FIG. 21, namely, so as to expose through the screen 13 the same areas as are being exposed through the clear dots 145. It should be noted that the clear dots 145 are farther apart than the openings in the screen 13 (because of the geometry of FIG. 21) and the exposed areas in the emulsion 151 are still farther apart.

Figures 23, 24, 25:
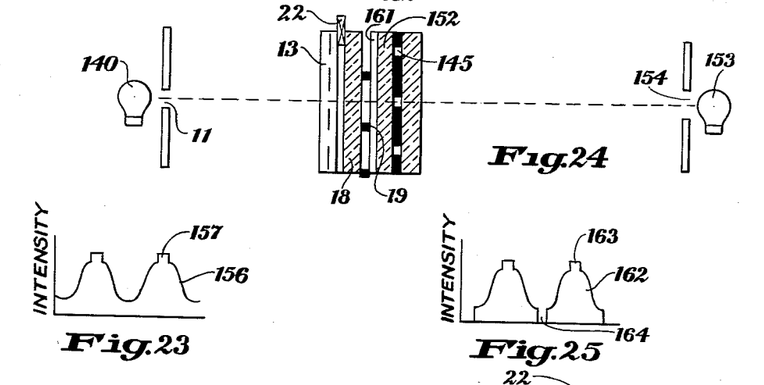
FIG. 23 is a graph of the intensity distribution at the sensitive surface in FIG. 22.
FIG. 24 illustrates a process combining that of FIG. 22 with that of FIG. 1 or of FIG. 18A.
FIG. 25 is a graph illustrating the distribution of intensity at the sensitive surface in FIG. 24.

The net result of the exposure in FIG. 22 is represented in FIG. 23 showing the distribution of intensity at the emulsion 151, by an undulating curve 156 the tops 157 of which receive extra exposure. When making contact screens by this method the lamps 140 and 153 are both tungsten lamps. When prescreening, either lamp or both lamps may be highly intensity flash lamps to give Clayden desensitization according to their respective exposures. The non-additivity of Clayden exposures must be taken into account when seeking any particular effects by this special process. It should be noted from FIG. 23 that the effect of the rear exposure is to add intensity at the tops of the curve rather than to give lower intensity at the bottoms of the curve as shown in FIG. 3 for example.

FIG. 24 illustrates schematically a combination of the process shown in FIG. 22 with the screen masking process according to the present invention. In FIG. 24, a tint on support 18 with opaque dots 19 is placed in contact with the emulsion 161 which is to receive the exposure both through the clear dots 145 and through the screen 13. As in FIG. 1 the dots 19 are registered with the opaque areas of the ruled screen 13. The points in the emulsion 161 receiving maximum exposure through the screen 13 are registered with the points receiving maximum exposure through the dots 145 from the lamp 153 and these points are half way between the opaque dots 19 of the screen mask. The intensity distribution at the emulsion layer 161 is illustrated in FIG. 25 by an undulating curve 162 having increased intensity 163 at the tops and sharply decreased intensity as indicated by areas 164 at the bottoms of the undulating curve. This process is particularly useful in making contact screens having high contrast both in the corners and the centers of the dots, which gives low contrast in the extreme highlights and in the shadows of the final picture made therewith. For such purposes the emulsion 161 has normal contrast. For prescreening, the emulsion 161 should be Clayden sensitive and a flash lamp should be used in place of a tungsten lamp 140 (and perhaps also in place of lamp 153 if special effects are desired).

Certain emulsions are Clayden desensitizable by X-rays and in such cases X-rays may be used in place of the flash exposure in any of the prescreening systems herein described.

Figure 26:
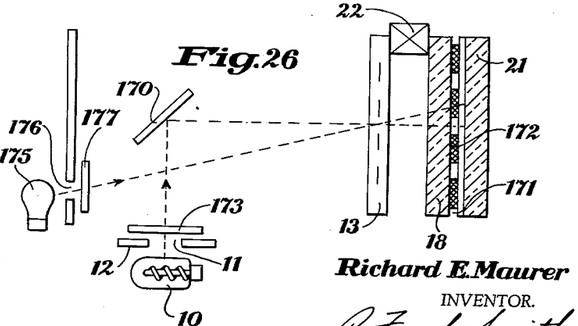
FIG. 26 illustrates a process combining the present invention with hypersensitizing and involving a blue and a yellow exposure.
Figure 27:
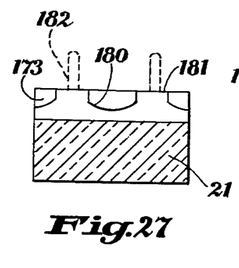
FIG. 27 illustrates the distribution of sensitivity in a film prescreened by the method of FIG. 26.

FIGS. 26 and 27 do produce some additional effects since they permit hypersensitization to be combined with prescreening by the present invention, but the need for this combination is not usually sufficient to warrant the complicated procedure. Nevertheless such an effect can be obtained where needed.

In FIG. 26 light from a flash lamp 10 through an aperture 11 in the housing 12 is reflected by a mirror 170 to give Clayden prescreening through a screen 13 on a Clayden sensitive emulsion 171. The screen mask in this case, however has yellow dots 172 covering about 50% of the area rather than tiny black dots 19 as used in FIG. 1. These dots serve to mask the Clayden desensitization as before and over a much larger area. To insure complete masking a blue filter 173 is located at the aperture 11. Either before, after or at the same time as the desensitizing exposure, a hypersensitizing exposure is given by a lamp 175 through an aperture 176 and a yellow filter 177. The effect of the yellow filter is to eliminate the effect of the masking screen 172.

The location of the aperture 176 is such that the areas of the emulsion 171 behind the yellow dots 172 receives the maximum hypersensitizing exposure. The total effect is shown in FIG. 27 in which the Clayden desensitization is represented by the curve 180 with no desensitizing in the centers 181 of the dot and extending over about 50% of the dot area. However as indicated by broken lines 182 the very core of the center is hypersensitized. This extends the range or scale of the prescreened film but since it involves hypersensitization and since the present invention gives sharp clean dots even with the high Clayden sensitive emulsion and permits full utilization of the Clayden effect, the added scale and the hard core of the hypersensitizing are generally unnecessary. It is only in special cases that the system shown in FIG. 26 would be needed.

I claim:

1. A prescreened photographic material comprising a support and a uniformly thick photosensitive silver halide emulsion layer on the support with a halftone dot pattern of varying sensitivity uniformly distributed throughout the layer with (a) uniform maximum sensitivity free of Clayden desensitization extending over dot center areas each covering 1 to 10 percent of a total dot area, said maximum sensitivity being that of the unexposed emulsion, with (b) sensitivity dropping at the edges of said center areas, more sharply than elsewhere in the total dot area, to a value between 50% and 90% of said maximum sensitivity and with (c) the sensitivity decreasing on a smooth curve from said value to a minimum sensitivity at the dot corners between 5 and 25% of said maximum sensitivity, the dot areas other than said center areas being Clayden desensitized.

2. The method of prescreening Clayden sensitive photographic film which comprises placing substantially in contact with the film a uniform halftone tint of effectively opaque approximately sharp dot centers, each covering 1 to 10 percent of the total dot area, placing a sharp cross-line halftone screen at about halftone distance in front of the tint and film with the intersections of the crosslines registered in front of the dot centers, exposing the film simultaneously through the screen and the tint to a high intensity short duration uniform exposure of sufficient intensity and sufficiently short duration to produce a Clayden desensitization, between .05 and .3 in equivalent log E units, near the edges of said tint dot centers and to produce additional Clayden desensitization up to a maximum, between .6 and 1.6 in equivalent log E units, at the dot corners aligned with the apertures of said crossline screen.

3. The method according to claim 2 in which said tint is prepared by placing said crossline screen in front of a rigid, transparent plate having a high contrast photosensitive layer on the front thereof and optically at halftone distance from the layer, exposing the layer through the screen and plate sufficiently to render developable dot centers aligned with the intersections of the crosslines, each center covering 1 to 10 percent of each total dot area and processing the layer by developing it to a negative with small opaque dot centers, rehalogenizing it, uniformly, substantially fully, re-exposing it, developing it a second time to form a positive, peroxide etching it to remove the silver and the adjacent gelatin, re-exposing and developing the small residual dots to form substantially opaque dots in said 1 to 10 percent areas with the layer removed from the plate in the other areas, whereby when said tint is placed in contact with the film to be prescreened, only the tops of the opaque dot centers touch the film.

4. The method according to claim 2 in which said tint is prepared by placing a high contrast emulsion layer at halftone distance behind the screen, exposing the layer through apertures aligned to expose the areas behind the intersections of the crosslines of the screen the exposure being of sufficient intensity and duration to produce a latent image behind each intersection covering 1 to 10% of the total dot area, developing the layer to a negative tint with small opaque dot centers, placing a second high contrast emulsion layer in contact with the negative tint exposing the second layer through the negative tint, developing it to a positive tint with small clear dot centers, peroxide etching it to remove the silver and the adjacent gelatin, re-exposing and developing the small residual dot centers.

5. The method of making a contact halftone screen which comprises placing substantially in contact with a relatively long scale high D max photographic emulsion layer, a uniform halftone tint of effectively opaque dot centers each covering 1 to 10 percent of the total dot area, placing a sharp crossline halftone screen at about halftone distance in front of the tint and layer with the intersections of the crosslines registered in front of the dot centers, exposing the layer simultaneously through the screen and the tint to a uniform exposure sufficiently to render the areas adjacent to the opaque dot centers slightly fogged and the corners aligned with the screen openings substantially fully fogged and reversal processing the layer (a) to a uniform maximum density over said dot centers covering 1 to 10 percent of the total dot areas, (b) to a density .02 to .6 less than said maximum density adjacent to said dot centers and, (c) to a minimum density at said corners of the dots.

6. The method of making a contact halftone screen which comprises placing substantially in contact with a relatively long scale high D max photographic emulsion layer a uniform halftone tint of effectively opaque dot centers each covering 1 to 10 percent of the total dot area, placing a sharp crossline halftone screen at about halftone distance in front of the tint and layer with the intersections of the crosslines registered in front of the dot centers, exposing the layer simultaneously through the screen and the tint to a uniform exposure from an aperture, sufficiently to render the areas adjacent to the opaque dot centers slightly fogged and the corners aligned with the screen openings substantially fully fogged and developing the layer, said aperture being smaller than that which through each screen opening illuminates directly the total dot area corresponding to that opening.

7. The method of prescreening Clayden sensitive photographic film which comprises placing the film in contact with one surface of a halftone screen device whose effective density at said surface to light incident on the other side of the device (a) is high and uniform at the dot centers of the screen and extending over center areas 1 to 10 percent of the total dot area, (b) falls at the edges of said center areas more sharply than elsewhere in the total dot area to a lower value and (c) continues to fall on a smooth curve from said lower value to a minimum value at the corners of the dots, the minimum value being substantially clear, and exposing the film through said halftone screen device to a high intensity, short duration, uniform exposure of sufficient intensity and sufficiently short duration to give substantially maximum Clayden desensitization of the film adjacent to said corners of the dots.

References Cited in the file of this patent

UNITED STATES PATENTS

| | | |
|---|---|---|
| 2,292,313 | Yule | Aug. 4, 1942 |
| 2,691,580 | Howe | Oct. 12, 1954 |
| 2,691,586 | Yule et al. | Oct. 12, 1954 |
| 2,708,626 | Yule et al. | May 17, 1955 |
| 2,789,905 | Austin | Apr. 23, 1957 |